C. ROMINE.
Flour and Meal Chest with Sifting Attachment.
No. 201,557. Patented March 19, 1878.
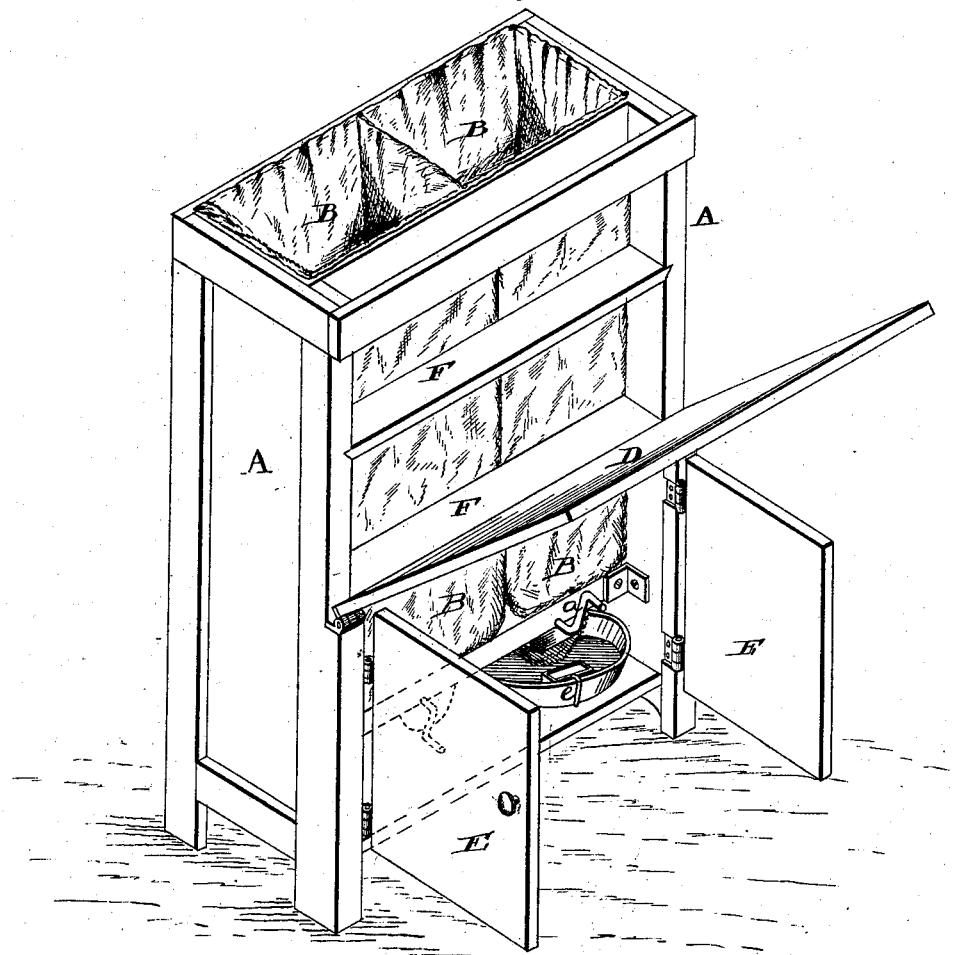
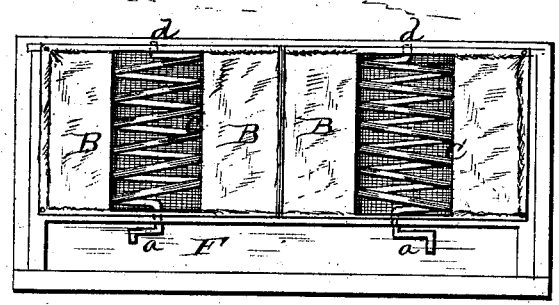
WITNESSES
INVENTOR
Cyrus Romine
ATTORNEYS

UNITED STATES PATENT OFFICE.

CYRUS ROMINE, OF WILLIAMSPORT, INDIANA.

IMPROVEMENT IN FLOUR AND MEAL CHEST WITH SIFTING ATTACHMENT.

Specification forming part of Letters Patent No. 201,557, dated March 19, 1878; application filed February 11, 1878.

*To all whom it may concern:*

Be it known that I, CYRUS ROMINE, of Williamsport, in the county of Warren, and in the State of Indiana, have invented certain new and useful Improvements in Flour and Meal Chest with Sifting Attachment; and do hereby declare that the following is a full, clear, and exact description thereof, reference being had to the accompanying drawings, and to the letters of reference marked thereon, making a part of this specification.

The nature of my invention consists in the construction and arrangement of the several parts of a meal and flour chest, the peculiarities of which will be hereinafter more fully described.

To enable those skilled in the art to make and use my invention, I will proceed to describe its construction and operation.

In the accompanying drawings, making a part of this specification, Figure 1 represents a perspective, and Fig. 2 a cross-section taken near the bottom of the chest.

In the figures, A represents a rectangular box or chest of convenient and suitable size to hold an ordinary bag of flour and one of meal, and still leave room for a sifting apparatus and receiving-pans. This box is provided with three doors—one, D, which lets down, as seen, for the purpose of forming a kneading and bread board. The other two, E E, open outward to form a support for the bread-board D, and at the same time disclose the bottom part of the chest.

B B represent two bags, one of which is filled with flour and the other with meal. An opening is made in the bottom of the bags, and the opening in each case communicates with a chamber, the bottom of which is covered with a piece of semicircular gauze-wire. In this chamber is placed a worm-screw made of wire, which has a crank, a, upon one end, by means of which it is revolved. The revolving of this screw agitates the flour and meal, and, working lightly against the gauze, forces the particles through into the receiving-pans below. One end of the gauze-wire meal-chamber is left partially open to allow the husks to drop out. A small scoop, as seen at e, is placed to receive them. This scoop may be graduated, so that it will also answer for a measure.

F F represent shelves, which are disclosed by the door D, and which are intended for holding bottles or cups, and such things containing spices and salt, and seasonings of any kind.

It will readily be seen that this forms a most convenient and economical chest, free from vermin of all kinds, as also from dust and trash. The bags can be easily removed and cleansed when at any time they become musty.

Having thus fully described my invention, what I claim as new, and desire to secure by Letters Patent, is—

In a meal and flour chest holding bags, a chamber with which the bottoms of said bags communicate, which is provided with a semicircular gauze bottom and a wire coil on journals, as and for the purpose set forth.

In testimony that I claim the foregoing I have hereunto set my hand this 15th day of January, 1878.

CYRUS ROMINE.

Witnesses:
M. H. PEARSON,
M. J. HAINES.